(No Model.)
N. W. HOLT.
ROLLER MILL.
No. 266,152. Patented Oct. 17, 1882.
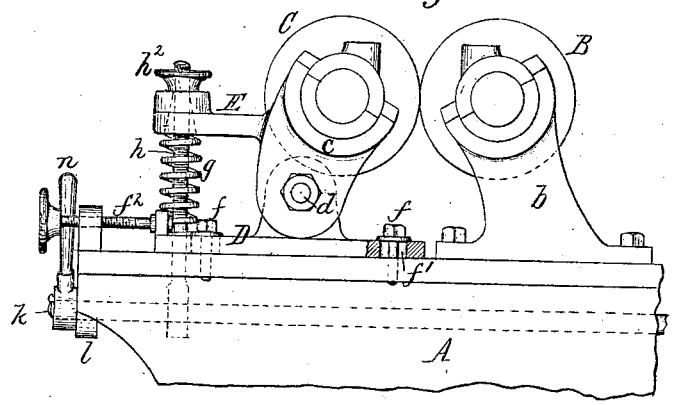
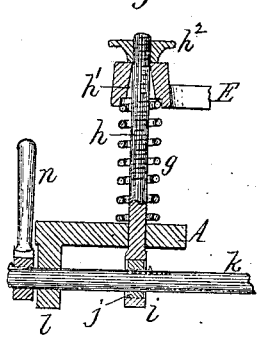
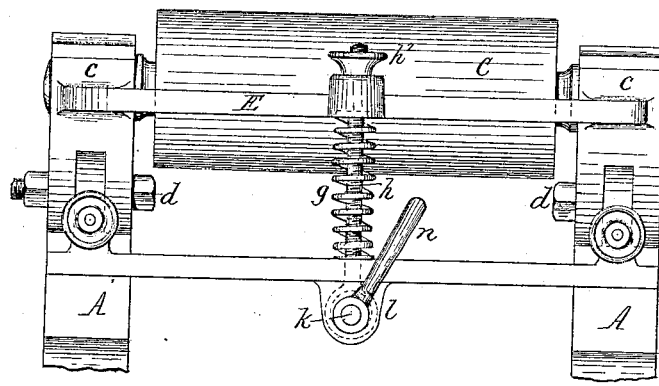
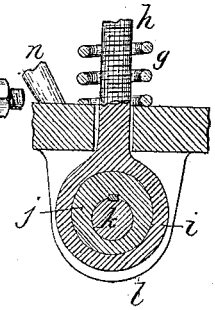
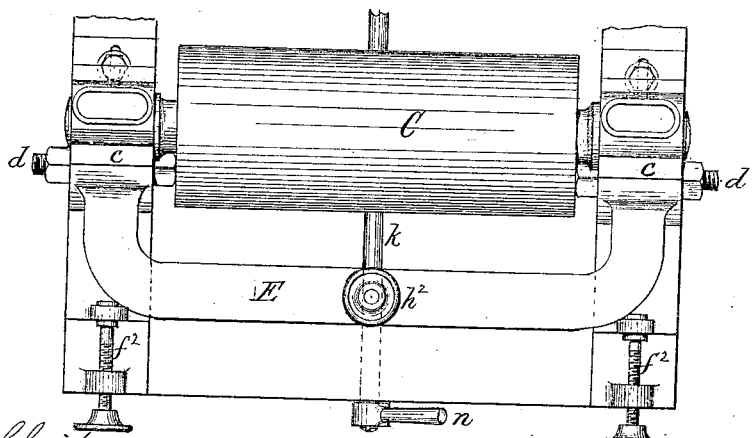
Witnesses:
Chas. J. Buchheit
Edw. J. Brady
N. W. Holt, Inventor.
By Wilhelm Bonner
Attorneys.

UNITED STATES PATENT OFFICE.

NOAH W. HOLT, OF BUFFALO, NEW YORK, ASSIGNOR OF ONE-THIRD TO RICHARD K. NOYE, OF SAME PLACE.

ROLLER-MILL.

SPECIFICATION forming part of Letters Patent No. 266,152, dated October 17, 1882.

Application filed March 9, 1882. (No model.)

*To all whom it may concern:*

Be it known that I, NOAH W. HOLT, of the city of Buffalo, in the county of Erie and State of New York, have invented new and useful Improvements in Roller-Mills, of which the following is a specification.

This invention relates to an improvement in the mechanism whereby the roller which is mounted in movable bearings is moved toward or from the roller which is mounted in fixed bearings for adjusting the space between the rollers or for separating the rollers in starting the mill, and more particularly to a roller supported in movable bearings which are rigidly connected, and provided with a single adjusting contrivance applied to the connected bearings in such manner that both bearings are moved simultaneously in either direction.

The object of my invention is to provide means for adjusting each bearing of the adjustable roller toward or from the stationary roller or other surface against which the adjustable roller operates to maintain the parallelism of the roller with the stationary roller or other surface; and my invention consists, to that end, of the devices hereinafter fully described, and pointed out in the claims.

In the accompanying drawings, Figure 1 is a side elevation of a pair of rollers provided with my improvement. Fig. 2 is an end elevation, and Fig. 3 a top plan view thereof. Fig. 4 is a vertical section of the adjusting mechanism. Fig. 5 is a vertical section of the lower portion of the adjusting mechanism at right angles to Fig. 1.

Like letters of reference refer to like parts in the several figures.

A represents the frame of the machine, and B a roller mounted in fixed bearings $b$.

C represents the roller which is made movable toward and from the roller B, and $c$ are the bearings in which the journals of the roller C rotate. These bearings are each pivoted by a horizontal bolt, $d$, to a base-plate, D, which is adjustably secured to the frame A by bolts $f$ and elongated openings $f'$, and an adjusting-screw, $f^2$, or in any other suitable manner, so as to be adjustable toward and from the roller B.

E represents a bar which connects the bearings $c$ on the outer side of the roller C, and which may be cast in one piece with the bearings $c$, as shown, or otherwise rigidly secured to the same, so as to cause both bearings to move simultaneously in either direction.

$g$ represents a spiral or other suitable spring, applied to the connecting-bar E in such manner as to press the roller C against the roller B. As shown in the drawings, the spring $g$ rests upon the frame A, and bears against the under side of the bar E.

$h$ represents a screw-rod, which is surrounded by the spring $g$, and which passes with its upper end through an opening, $h'$, in the connecting-bar E. The upper end of the screw-rod $h$ is provided with a hand-wheel or thumb-nut, $h^2$, bearing upon the upper side of the connecting-bar.

$i$ is a ring formed at the lower end of the screw-rod $h$; and $j$ is an eccentric mounted on a horizontal shaft, $k$, and engaging in the ring $i$, so that the screw-rod $h$ is raised and lowered by turning the eccentric $j$. The shaft $k$ turns in bearings $l$, formed on the frame A of the machine, and is provided at either end with a hand-lever, $n$, whereby it can be turned. The spring $g$ tends to hold the roller C against the roller B. By tightening the hand-wheel $h^2$ the spring is compressed and both bearings $c$ are swung on their pivots away from the roller B. Hence the position of the roller C with reference to the roller B can be nicely regulated by the hand-wheel $h^2$. If the roller C should not be parallel with the roller B, it is easily made parallel with the same by adjusting either or both of the base-pieces D. The throw of the eccentric $j$ is made so large that by giving the shaft $k$ a half-turn, so as to bring the center of the eccentric on the lower side of the shaft, the roller C is separated sufficiently from the roller B to permit the mill to be easily started. By returning the eccentric to its upper position the roller C is returned to its former working position without disturbing its adjustment with reference to the roller B.

It will be seen from the foregoing that both bearings of the movable roller retain always the same relative position, and that any relaxation of the spring $g$ affects both bearings alike, thereby keeping the movable roller parallel with the roller supported in the fixed bearings.

When the device is applied to a roller-mill containing two pairs of rollers the shaft $k$ is extended to the opposite end of the machine, and the eccentrics of both adjusting devices are mounted on this shaft, so that by turning the shaft both movable rollers are simultaneously swung away from the stationary rollers for starting the mill.

I claim as my invention—

1. The combination, with a roller, C, of movable bearings $c$, connecting-bar E, and base-pieces D, upon which the bearings $c$ are supported, and means for adjusting them toward and from the roller or other surface against which the roller C operates, substantially as set forth.

2. The combination, with a roller, C, of movable bearings $c$, connecting-bar E, provided with an adjusting device, base-pieces D, and means for adjusting them toward and from the roller or other surface against which the roller C operates, and pivots $d$, whereby the bearings $c$ are attached to the base-piece D, substantially as set forth.

NOAH W. HOLT.

Witnesses:
JNO. J. BONNER,
CHAS. F. GEYER.